2,761,784

REACTION PRODUCT OF POLYOXYETHYLENE DERIVATIVE OF A FATTY ACID PARTIAL ESTER OF HEXITOL ANHYDRIDE AND CITRIC ACID AND AN ANTIOXIDANT CONTAINING THE SAME

Lloyd A. Hall, Chicago, Ill., assignor to The Griffith Laboratories, Inc., a corporation of Illinois No Drawing. Application November 6, 1952, Serial No. 319,177

9 Claims. (Cl. 99—163)

This invention relates to reaction products of polyoxyethylene derivatives of fatty acid partial esters of hexitol anhydrides and citric acid and also to antioxidant compositions containing the same.

The protection of fats against oxidation has long been a problem. Lard, particularly, requires the presence of an antioxidant to avoid rancidity. These antioxidants must be fat soluble in themselves or made so. The antioxidants now primarily in use are propyl gallate, BHA (butylated hydroxyanisole) and NDGA (nordihydroguaiaretic acid). In connection with all of these antioxidants, it has been customary to use synergists. Of these, citric acid is the most important because it not only improves the action of the antioxidant, but because it is a metal sequestering agent and thus prevents or inhibits color changes and also by its sequestration is in a position to remove metals which may act as pro-oxidants. Citric acid, however, is not fat soluble and the problem of obtaining proper distribution of it in the fatty material has not hitherto been overcome.

I have now discovered that citric acid may be rendered fat soluble as well as emulsifiable in water without in any way destroying the value of the citric acid as a synergist or as a metal sequestering material by reacting it under proper conditions with polyoxyethylene derivatives of fatty acid partial esters of hexitol anhydrides. When so reacted, it may be introduced to the fat in any suitable manner, either together with or separately from the primary antioxidant.

The polyoxyethylene derivatives of fatty acid partial esters of hexitol anhydrides are emulsifying or dispersing agents. However, in the present case, they form a reatcion product of unknown chemical constitution with citric acid. The existence of this chemical product has been shown definitely by X-ray analysis. Micro-analysis of the reaction product shows a complete absence of citric acid.

The preferred polyoxyethylene derivatives of fatty acid partial esters of hexitol anhydrides actually employed are a sorbitan trioleate polyoxyalkylene derivative and a sorbitan tristearate polyoxyalkylene derivative. Both of these compounds form an oil liquid at about 25° C. and tend to gel on standing. Their viscosity cp. at 25° C. is about 200 to 400. These compounds are partial esters of such common fatty acids as lauryl, palmitic, stearic and oleic acids and hexitol anhydrides such as hexitans and hexides, derived from sorbitol with polyoxyethylene chains added to the nonesterified hydroxyls.

In preparing a reaction product of this invention, sorbitan tristearate polyoxyalkylene derivative was added to corn oil previously heated to a temperature of from 245° to 250° F. and the heated solution agitated continuously for a period of 20 minutes. The temperature of the solution was gradually increased to about 265° F. following which anhydrous citric acid was added uniformly over the entire surface taking approximately 20 minutes for this addition. The temperature of 265° F. was maintained and the resulting solution stirred until complete reaction occurred, following which propyl gallate was then added. In those formulations in which BHA (butylated hydroxyanisole) was added, the solution was then cooled to about 120° F. and BHA concentrate then added slowly. The resulting solution was stirred for about 25 minutes and then cooled.

Formulations were made as follows:

(A)

| | Percent |
|---|---|
| Sorbitan tristearate polyoxyalkylene derivate | 20.0 |
| Anhydrous citric acid | 9.0 |
| Propyl gallate | 3.0 |
| Corn oil | 34.7 |
| | 66.7 |

(B)

| | |
|---|---|
| Sorbitan tristearate polyoxyalkylene derivative | 20.0 |
| Anhydrous citric acid | 8.0 |
| Propyl gallate | 6.0 |
| Corn oil | 32.7 |
| | 66.7 |

(C)

| | |
|---|---|
| Sorbitan tristearate polyoxyalkylene derivative | 20.0 |
| Anhydrous citric acid | 4.7 |
| Propyl gallate | 8.0 |
| Corn oil | 34.0 |
| | 66.7 |

(D)

| | |
|---|---|
| Sorbitan tristearate polyoxyalkylene derivative | 20.0 |
| Anhydrous citric acid | 4.0 |
| Propyl gallate | 9.0 |
| Corn oil | 33.7 |
| | 66.7 |

(E)

| | |
|---|---|
| Products A, B, C or D | 66.7 |
| BHA concentrate | 33.3 |
| | 100.0 |

BHA concentrate:

| | |
|---|---|
| Butylated hydroxyanisole | 13.32 |
| Corn oil | 19.98 |
| | 33.3 |

Formulations were made with sorbitan trioleate polyoxyalkylene derivative as follows:

(A')

| | |
|---|---|
| Sorbitan trioleate polyoxyalkylene derivative | 23.000 |
| Anhydrous citric acid | 8.735 |
| Propyl gallate | 5.335 |
| Corn oil | 29.630 |
| | 66.7 |

(B')

| | |
|---|---|
| Sorbitan trioleate polyoxyalkylene derivative | 23.000 |
| Anhydrous citric acid | 6.735 |
| Propyl gallate | 5.335 |
| Corn oil | 31.630 |
| | 66.7 |

(C')

| | |
|---|---|
| Sorbitan trioleate polyoxyalkylene derivative | 23.0 |
| Anhydrous citric acid | 3.0 |
| Propyl gallate | 6.0 |
| Corn oil | 34.7 |
| | 66.7 |

(D')

| | |
|---|---|
| Sorbitan trioleate polyoxyalkylene derivative | 23.000 |
| Anhydrous citric acid | 5.735 |
| Propyl gallate | 4.335 |
| Corn oil | 33.630 |
| | 66.7 |

(E')

| | |
|---|---|
| Sorbitan trioleate polyoxyalkylene derivative | 17.000 |
| Anhydrous citric acid | 3.735 |
| Propyl gallate | 3.335 |
| Corn oil | 42.630 |
| | 66.7 |

(F')

| | |
|---|---|
| Sorbitan trioleate polyoxyalkylene derivative | 23.000 |
| Anhydrous citric acid | 3.735 |
| Propyl gallate | 3.335 |
| Corn oil | 36.630 |
| | 66.7 |

(G')

| | |
|---|---|
| Products A', B', C', D', E', or F' | 66.7 |
| BHA concentrate | 33.3 |
| | 100.0 |

BHA concentrate:

| | |
|---|---|
| Butylated hydroxyanisole | 13.32 |
| Corn oil | 19.98 |
| | 33.3 |

When employing sorbitan tristearate polyoxyalkylene derivative it was found that optimum solubilization of the derivative in corn oil occurred at a temperature ranging from 245° to 250° F. whereas optimum solubilization of sorbitan trioleate polyoxyalkylene derivative in corn oil occurred at a temperature of from 200° to 235° F.

The same products may be prepared with cottonseed oil as well as other vegetable or animal oils. Selection of an animal oil as against selection of a vegetable oil will normally be determined by the product in which the material is to be employed.

To prevent separation of the citric acid, it is important that the amount of free water present during the reaction should not exceed about 2%.

Instead of employing anhydrous citric acid in the above described formulations, U. S. P. crystalline citric acid (the monohydrate $C_6H_8O_7 \cdot H_2O$ containing 8.58% $H_2O$ of crystallization) may be employed.

X-ray analyses of the resultant antioxidant products of the above described formulations show that the characteristic diffraction lines for citric acid as such were not present in the X-ray patterns for these products. Instead, the lines were different in character, thus indicating that new compounds were formed.

It was found that the 8 to 6 ratio (formulation B above) of citric acid to propyl gallate results in a highly viscous product and appears to be the limit of concentration of citric acid and propyl gallate. When the concentration of citric acid is below about 4%, it was found that formulation D apparently represents the limit of propyl gallate concentration.

While I have given examples of particular antioxidants, the polyoxyethylene derivatives of fatty acid partial esters of hexitol anhydrides—citric acid reaction products are synergist and ion sequestering agents for antioxidants generally.

The foregoing detailed description is given for clearness of understanding only and no unnecessary limitations should be understood therefrom, as modifications will be obvious to those skilled in the art.

I claim:

1. As a new compound, the reaction product of a polyoxyethylene derivative of a fatty acid partial ester of a hexitol anhydride and citric acid.

2. A compound as set forth in claim 1 in which the polyoxyethylene derivative is a sorbitan tristearate polyoxyalkylene derivative.

3. A composition as set forth in claim 1 in which the polyoxyethylene derivative is a sorbitan trioleate polyoxyalkylene derivative.

4. An antioxidant composition comprising a solution in an edible oil of the fat soluble reaction product of a polyoxyethylene derivative of a fatty acid partial ester of a hexitol anhydride and citric acid.

5. An antioxidant composition comprising a solution in an edible oil of the fat soluble reaction product of a polyoxyethylene derivative of a fatty acid partial ester of a hexitol anhydride and citric acid, and an oil soluble antioxidant.

6. A composition as set forth in claim 5 in which the antioxidant comprises propyl gallate.

7. A composition as set forth in claim 5 in which the antioxidant comprises butylated hydroxyanisole.

8. The method which comprises reacting a polyoxyethylene derivative of a fatty acid partial ester of a hexitol anhydride with citric acid to form a fat soluble reaction product.

9. A composition as set forth in claim 5 in which the antioxidant comprises propyl gallate and butylated hydroxyanisole.

References Cited in the file of this patent
UNITED STATES PATENTS

| | | |
|---|---|---|
| 2,295,163 | De Groote | Sept. 8, 1942 |
| 2,295,168 | De Groote | Sept. 8, 1942 |
| 2,535,910 | Fonyo | Dec. 26, 1950 |
| 2,701,203 | Gooding et al. | Feb. 1, 1955 |